United States Patent
Boni et al.

Patent Number: 5,271,948
Date of Patent: Dec. 21, 1993

[54] METHOD FOR PREPARING COLLAGEN ENCASED SAUSAGE PRODUCTS

[75] Inventors: Kenneth A. Boni; James E. Walsh, both of Columbia, S.C.

[73] Assignee: Teepak, Inc., Westchester, Ill.

[21] Appl. No.: 844,832

[22] Filed: Mar. 3, 1992

[51] Int. Cl.$^5$ .............................................. A23L 1/317
[52] U.S. Cl. .................................. 426/278; 426/513; 426/516; 426/646
[58] Field of Search ................... 426/89, 92, 277, 582, 426/646, 105, 140, 513, 302, 516, 278

[56] References Cited

U.S. PATENT DOCUMENTS

| | | | |
|---|---|---|---|
| 3,041,182 | 6/1962 | Hansen et al. | 426/92 |
| 3,073,702 | 1/1963 | Keil et al. | 426/92 |
| 3,123,483 | 3/1964 | McKnight | 426/92 x |
| 3,622,353 | 11/1971 | Bradshaw et al. | 426/513 X |
| 3,809,772 | 5/1974 | Jones et al. | 426/92 X |
| 3,917,855 | 11/1975 | Burke | 426/92 |
| 4,407,829 | 10/1983 | Sjolander | 426/92 X |

FOREIGN PATENT DOCUMENTS

| | | | |
|---|---|---|---|
| 63-258561 | 10/1988 | Japan | 426/646 |
| 8803759 | 6/1988 | PCT Int'l Appl. | 426/92 |
| 1232801 | 6/1969 | United Kingdom . | |
| 1288111 | 9/1972 | United Kingdom | 426/89 |

*Primary Examiner*—Arthur L. Corbin
*Attorney, Agent, or Firm*—Michael L. Dunn

[57] ABSTRACT

A collagen-coated food product and a process for its manufacture which comprises a shaped food substance encased in a coagulated collagen fiber dispersion which is acidified with an inorganic acid and set in a bath which is essentially ammonia free. The process according to the invention is a process for the preparation of a collagen-coated food product wherein the collagen is coextruded with the food product wherein the collagen product for the extrusion comprises a collagen fiber dispersion, which is acidified with an inorganic acid and set in a setting bath which is essentially ammonia free.

7 Claims, No Drawings

METHOD FOR PREPARING COLLAGEN ENCASED SAUSAGE PRODUCTS

BACKGROUND OF THE INVENTION

This invention relates to collagen encased food products such as sausages and encased cheeses. More particularly, the invention relates to such products wherein the collagen is coextruded with the food product to form a collagen coating thereon.

Traditionally, encased products such as sausages, have been prepared by extruding sausage meat into a prepared sausage casing.

Such casings have usually been prepared from sheep or pig intestines, regenerated cellulose, regenerated collagen and for certain products, made entirely from or including synthetic polymers or copolymers such as polyethylene, polyvinylidene chloride or nylon.

The only truly edible commercial food casings have been animal intestines and regenerated collagen.

Use of prepared food casings has had certain disadvantages. Such disadvantages have included the complexities involved in preparing the casings, packaging the casings, preserving the casings and utilizing the casings on stuffing machines. An especially troublesome problem has been utilization of the stuffing equipment since there is no way to continuously stuff a prepared food casing. Infinitely long casings do not exist and even if they did, there is no way to stuff such a casing since in all stuffing operations food must, in some way, pass through the interior of the casing, from one end to the other. As a result, stuffing of prepared food casings is, of necessity, a batch operation.

Additional disadvantages of using prepared shirred collagen casings are that the cross sectional area through which food may pass during stuffing is smaller when a shirred strand is used and the cost of manufacture of shirred strands is higher than would be desirable.

Attempts have been made to continuously prepare such encased food products by forming the casing as the product is made. Examples of such attempts have been to shape and seal a flat film into the form of a tube as the product is made and to coextrude products with the food which congeal or harden to form a casing.

An example of the latter is described in British Patent 1,232,801 where coextrusion of collagen with the food product is described. Such processes have not generally been successful with fresh sausage products since in the absence of high temperature processing or undesirable coagulation additives, the collagen coating is insufficiently stable to permit cooking of the sausage under usual conditions, e.g., by frying.

British Patent 1,232,801 does describe one example of collagen coated sausage, which does not appear to be heat treated, where an organic acid acidified collagen material is exposed to a setting bath containing ammonia. The exposure to ammonia unfortunately results in an undesirable odor and taste in the food product.

BRIEF DESCRIPTION OF THE INVENTION

In accordance with the present invention, there is provided an improved collagen-coated food product such as fresh sausage and an improved process for its manufacture.

The product comprises a shaped food substance, e.g., fresh food product such as fresh sausage, encased in a coagulated collagen fiber dispersion which is acidified with a strong inorganic acid and which is set or coagulated in a bath which is essentially ammonia free. The resulting product has an essentially ammonia free coagulated casing.

The process according to the invention is a process for the preparation of a collagen-coated food product wherein the collagen is coextruded with the food product wherein the collagen product for the extrusion comprises a collagen fiber dispersion which is acidified with an inorganic acid and which is set or coagulated in a bath which is essentially ammonia free.

DETAILED DESCRIPTION OF THE INVENTION

Shaped food substances in accordance with the invention are usually, but not essentially, in the form of cylinders or tubes which usually, but not necessarily have tapered or rounded ends. Such products include especially sausages and cheeses in tubular shapes and most especially fresh food product such as fresh sausage.

Such shaped food substances in accordance with the invention are generally edible, in their entirety, including collagen casing material.

Collagen suitable for use in accordance with the present invention may be obtained from any source known to those skilled in the art, e.g., from connective tissue in animals, corium layers split from bovine hides, or from tendon. Such collagen suitable for use in accordance with the present invention is in a final step always treated with a strong inorganic acid, usually to a pH of less than about 3.5 and usually from about 2.5 to about 3.0. A preferred strong acid is hydrochloric acid, although other strong acids such as sulfuric acid or phosphoric acid may be used.

"Strong acid" as used herein means an inorganic acid which in 0.1N aqueous solution has a pH of about 1.5 or less.

"Essentially ammonia free" as used herein means that insufficient ammonia, in the form of ammonium hydroxide, or otherwise, is used in the manufacture of the product to create adverse taste, odor, physical properties or toxicological effects.

"Fresh food product" as used herein means a food product which has not been heated within a casing or coating to an extent which would significantly discolor the protein within the food product.

Collagen products suitable for use in accordance with the present invention are aqueous dispersions containing at least about 3 weight percent and preferably at least 4.5 weight percent collagen. Due to viscosity consideration, the dispersion usually contains less than about 8 weight percent, often less than about 6 weight percent and sometimes as little as 4.0 weight percent collagen.

Preparation of acidified dispersions of collagen fibers in water, suitable for use in accordance with the present invention usually are made by one of two general processes. Such processes may be somewhat altered or hybridized with each other while still obtaining a satisfactory product.

In a first of such processes, known as the low solids process, a collagen containing starting material, usually the corium layer from alkaline dehaired bovine hides, is stored for a relatively short period of time, e.g., 2 to 10 days in the alkaline state (pH > 11.5).

The product is then reduced, usually by chopping and grinding, to small particles that can be blended into a relatively homogeneous mixture. The solids content of the mixture is determined in order to define quantities of water, powdered cellulose and acid to be added to the mixture to obtain the desired target composition.

The preferred strong acid for the process is hydrochloric acid; although, sulfuric acid may be used. Sufficient acid is added to obtain a target pH of 2.5 to 3.0. Significant quantities of weak acids, such as lactic or acetic acid, commonly used in production of acidified dispersions of collagen fibers, are excluded in accordance with the present invention.

Cellulose may be added to the composition in the form of fine fibers for the purpose of thermal stability and cost reduction. Usually from about 0.3 to about 3.0 weight percent of cellulose is present in the collagen dispersion.

The mixture is aged for from 4 to 16 hours and then treated by shearing action to further reduce particle size. The mixture is then again aged for from 18 to 60 hours, homogenized and filtered. Optionally, a second homogenization and filtration is used.

The range of collagen content in the low solids slurry is between about 3 and about 8 weight percent and preferably between about 4.5 and about 6 weight percent.

In a second of such processes, known as the fibrous slurry process, collagen containing material, e.g., corium layers, are stored for long periods, e.g., up to about 30 days in alkaline state, e.g., pH>11.5. Subsequently, the collagen material is chopped or diced. A strong inorganic acid, e.g., hydrochloric acid, is added to the collagen pieces to swell them prior to the input of mechanical actions to separate the collagen fibers. Sufficient acid is used to obtain a pH of from about 2.0 to about 3.0.

The fiber separation is usually accomplished by a crushing step such as may be obtained by a roll mill. The product obtained from the crushing step is then mixed with a suitable mixer, e.g., a blade mixer such as a Sigma Blade Mixer.

The resulting product is diluted and may include further addition of strong acid to obtain a target pH of from 2.5 to 3.0.

If desired, collagen solubilized by enzyme treatment may be added at this point.

The resulting product is homogenized by any suitable method known to those skilled in the art, e.g., by passage through plates or holes. The same equipment may optionally be used for homogenization as is used in the low solids method.

The homogenized product is filtered, e.g., by passing the dispersion through gaps between plates or through wire wound filters depending upon the viscosity of the slurry.

The preferred range of collagen content in the fibrous slurry is between about 4.5 and 8 weight percent.

In accordance with the present invention, the collagen slurry is applied to the exterior of a shaped food product such as fresh sausage, and coagulated. In a preferred embodiment, the collagen slurry is coextruded with the food product such as sausage meat, processed cold meat or cheese in a manner such that the product is coated with a film of the collagen slurry. The film is coagulated by contact with a brine solution followed by drying at below 35° C. at a relative humidity of from 10 to 25% for 5 to 20 minutes. In accordance with the present invention, the coagulation bath is essentially ammonia free.

It is to be understood that the following example serves to illustrate and not limit the scope of the present invention.

EXAMPLE

A corium layer split from bovine hides, that were dehaired in the alkaline state, was the starting material for preparation of the acidified dispersion of collagen fibers used to produce fresh sausage links. The corium layer was stored in the alkaline state for 8 days. Subsequent to alkaline treatment, particle reduction of the corium layer was accomplished by chopping and grinding. The collagen content of the slurry was 5.5%, the powdered cellulose content was 0.60%, and the pH was 2.8. Hydrochloric acid was the strong acid used in the process. The mixture was milled and homogenized. The output from the homogenizer was filtered through wire-wound filters having a spacing of 0.004 in. The slurry was homogenized and filtered twice before use in the coextrusion process. The slurry was coextruded with fresh sausage meat in a coextrusion system known to those skilled in the art and described in UK Patent 1,232,801, incorporated herein by reference. A fresh sausage emulsion was pumped through the extruder at 700 lbs/hr while the collagen slurry was pumped at about 32 lbs/hr. The sausage emulsion was at 13° and the collagen slurry was at 11.7° C. On emerging from the coextrusion die, the collagen coated meat passed through a 20° C. brine bath with a residence time of about 2 sec. The link diameter was 17.5 mm, the length was 111 mm, and the weight was 26 gms. After emerging from the brine bath, the links were conveyed through a drying tower maintained at 35° C. with a relative humidity of 18% where they spend 9.0 minutes. The link temperature on emerging from the dryer was 24° C. The collagen coated fresh links could be pan fried without splitting or uncovering the meat.

For comparison, links produced with the same meat emulsion and conditions of operation of the coextrusion system using collagen slurry produced with lactic acid, rather than strong mineral acid, were left completely uncovered after pan fry.

What is claimed is:

1. In a process for the preparation of an edible collagen-coated food product, which comprises a cylindrically shaped fresh sausage product, wherein collagen is coextruded with the food product to form a collagen coating on the food product, the improvement which comprises using a collagen product for the coextrusion which comprises a collagen fiber dispersion which was alkali treated and then acidified with a strong inorganic acid as a final acidification step prior to coextrusion, and wherein the coextruded collagen coating is set in a setting bath that contains an insufficient amount of ammonia to create adverse taste, odor, physical properties or toxicological effects.

2. The process of claim 1 wherein the collagen product being coextruded has a collagen solids content of from 3 to 8 weight percent.

3. The process of claim 2 wherein the collagen product includes from 0.3 to 3 weight percent of powdered cellulose.

4. The process of claim 1 wherein the pH of the collagen dispersion is from 2 to 3.5.

5. The process of claim 1 wherein the acid is hydrochloric acid.

6. The process of claim 1 wherein the coated food product is a fresh food product.

7. The process of claim 1 wherein the coated food product is a fresh sausage.

* * * * *